United States Patent
Kwon et al.

(10) Patent No.: US 10,492,137 B2
(45) Date of Patent: Nov. 26, 2019

(54) METHOD AND APPARATUS FOR CONTROLLING DRX OPERATION IN BEAM FORMING COMMUNICATION SYSTEM

(71) Applicant: Samsung Electronics Co., Ltd., Gyeonggi-do (KR)

(72) Inventors: Sangwook Kwon, Gyeonggi-do (KR); Anil Agiwal, Gyeonggi-do (KR); Hyunjeong Kang, Seoul (KR); Sukwon Kim, Gyeonggi-do (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 14/488,220

(22) Filed: Sep. 16, 2014

(65) Prior Publication Data

US 2015/0078189 A1     Mar. 19, 2015

(30) Foreign Application Priority Data

Sep. 16, 2013   (KR) .......................... 10-2013-0110951

(51) Int. Cl.
*H04W 52/02*  (2009.01)
*H04W 76/28*  (2018.01)
(Continued)

(52) U.S. Cl.
CPC ....... *H04W 52/0216* (2013.01); *H04W 24/08* (2013.01); *H04W 76/28* (2018.02);
(Continued)

(58) Field of Classification Search
CPC .. H04L 5/0048; H04W 24/08; H04W 52/0216
See application file for complete search history.

(56) References Cited

U.S. PATENT DOCUMENTS 7,072,692 B1 *  7/2006  Katz ................... H04B 7/0608
                                                            455/442
7,200,376 B2    4/2007  Cha et al.
(Continued)

FOREIGN PATENT DOCUMENTS

| EP | 2 157 830 A1 | 2/2010 |
| JP | 2010050969 A | 3/2010 |
| KR | 10-2013-0052670 A | 5/2013 |

OTHER PUBLICATIONS

Office Action dated Jul. 5, 2019 in connection with Korean Patent Application No. 10-2013-0110951, 12 pages.

*Primary Examiner* — Asad M Nawaz
*Assistant Examiner* — Berhanu D Belete

(57) ABSTRACT

A method for controlling a discontinuous reception operation in a beam forming communication system includes receiving a discontinuous reception operation request message from the mobile station; determining whether a discontinuous reception operation of the mobile station is set, based on the number of subframes necessary for measuring a beam of the base station by the mobile station and a maximum allowable delay time of a service provided for the mobile station, and when it is determined that a discontinuous reception operation is set for the mobile station, transmitting a response message containing information on a beam measuring duration and a feedback duration to the mobile station. Other embodiments including a base station and a mobile station are also disclosed.

22 Claims, 12 Drawing Sheets

(51) Int. Cl.
*H04W 24/08* (2009.01)
*H04L 5/00* (2006.01)
*H04B 7/06* (2006.01)
*H04B 7/08* (2006.01)
*H04W 16/28* (2009.01)

(52) U.S. Cl.
CPC ............ *H04B 7/0695* (2013.01); *H04B 7/088* (2013.01); *H04L 5/0053* (2013.01); *H04W 16/28* (2013.01); *Y02D 70/24* (2018.01); *Y02D 70/444* (2018.01)

(56) References Cited

U.S. PATENT DOCUMENTS

| | | | | |
|---|---|---|---|---|
| 8,179,828 | B2* | 5/2012 | Cai | H04W 52/0216 370/311 |
| 8,199,725 | B2* | 6/2012 | Yu | H04L 1/0027 370/334 |
| 8,442,025 | B2* | 5/2013 | Borsella | H04W 76/048 370/311 |
| 8,462,657 | B2* | 6/2013 | Cai | H04L 1/1829 370/252 |
| 8,743,764 | B2* | 6/2014 | Chen | H04W 76/048 370/311 |
| 9,094,977 | B2 | 7/2015 | Li et al. | |
| 9,313,736 | B2* | 4/2016 | Cucala Garcia | H04W 52/0216 |
| 9,338,070 | B2* | 5/2016 | Singh | H04L 43/08 |
| 9,420,533 | B2* | 8/2016 | Wu | H04W 52/0216 |
| 9,763,151 | B2* | 9/2017 | Kim | H04L 5/00 |
| 9,788,271 | B2* | 10/2017 | Futaki | H04W 36/0055 |
| 9,801,232 | B2* | 10/2017 | Deenoo | H04W 76/048 |
| 2004/0002357 | A1* | 1/2004 | Benveniste | H04W 72/12 455/550.1 |
| 2004/0063430 | A1* | 4/2004 | Cave | H04W 36/30 455/436 |
| 2005/0014533 | A1* | 1/2005 | Cave | H04W 74/0891 455/562.1 |
| 2005/0101354 | A1* | 5/2005 | Yang | H04B 7/0617 455/562.1 |
| 2005/0206564 | A1* | 9/2005 | Mao | H01Q 3/2605 342/377 |
| 2007/0184836 | A1* | 8/2007 | HC | H04W 52/0245 455/434 |
| 2008/0214249 | A1* | 9/2008 | Kim | H04B 1/1615 455/574 |
| 2008/0273492 | A1* | 11/2008 | Jeong | H04L 5/0057 370/329 |
| 2009/0203376 | A1* | 8/2009 | Sambhwani | H04J 11/0069 455/434 |
| 2009/0247214 | A1* | 10/2009 | Cai | H04W 52/0216 455/550.1 |
| 2010/0067392 | A1* | 3/2010 | Fox | H04W 16/28 370/252 |
| 2010/0118815 | A1* | 5/2010 | Kim | H04W 52/0216 370/329 |
| 2010/0234061 | A1* | 9/2010 | Khandekar | H04W 52/146 455/522 |
| 2010/0290509 | A1* | 11/2010 | Dalsgaard | H04W 76/005 375/220 |
| 2010/0330992 | A1* | 12/2010 | Bhattacharjee | H04W 52/028 455/436 |
| 2010/0331019 | A1* | 12/2010 | Bhattacharjee | H04W 52/0229 455/458 |
| 2011/0038348 | A1* | 2/2011 | Borsella | G10H 1/361 370/331 |
| 2011/0065448 | A1* | 3/2011 | Song | H04B 7/0632 455/452.2 |
| 2011/0128865 | A1* | 6/2011 | Doppler | H04W 76/048 370/252 |
| 2011/0182224 | A1* | 7/2011 | Ishii | H04W 56/005 370/311 |
| 2011/0188440 | A1* | 8/2011 | Wang | H04W 72/005 370/312 |
| 2011/0206009 | A1* | 8/2011 | Attar | H04W 36/0061 370/331 |
| 2011/0211490 | A1* | 9/2011 | Nikula | H04B 7/086 370/252 |
| 2011/0280141 | A1 | 11/2011 | Chin et al. | |
| 2011/0292854 | A1* | 12/2011 | Terry | H04L 5/001 370/311 |
| 2011/0319116 | A1* | 12/2011 | Iwamura | H04L 1/0026 455/517 |
| 2012/0014343 | A1* | 1/2012 | Womack | H04L 5/0094 370/329 |
| 2012/0044822 | A1* | 2/2012 | Kim | H04W 24/10 370/252 |
| 2012/0076060 | A1* | 3/2012 | Cai | H04L 1/0026 370/311 |
| 2012/0093000 | A1* | 4/2012 | Jeong | H04W 76/38 370/241 |
| 2012/0106424 | A1* | 5/2012 | Davies | H04W 76/048 370/311 |
| 2012/0155309 | A1* | 6/2012 | Bae | H04W 24/10 370/252 |
| 2012/0176950 | A1* | 7/2012 | Zhang | H04L 5/001 370/311 |
| 2012/0207040 | A1* | 8/2012 | Comsa | H04W 72/1215 370/252 |
| 2013/0028126 | A1* | 1/2013 | Kazmi | H04W 24/10 370/252 |
| 2013/0040684 | A1* | 2/2013 | Yu | H04B 7/0617 455/517 |
| 2013/0194991 | A1* | 8/2013 | Vannithamby | H04W 72/0493 370/311 |
| 2013/0223307 | A1* | 8/2013 | Ohlsson | H04W 52/0216 370/311 |
| 2013/0250782 | A1* | 9/2013 | Nimbalker | H04L 1/0038 370/252 |
| 2013/0331081 | A1* | 12/2013 | Rune | H04B 7/0408 455/418 |
| 2014/0029580 | A1* | 1/2014 | Jung | H04W 36/08 370/331 |
| 2014/0119255 | A1* | 5/2014 | Vannithamby | H04B 15/00 370/311 |
| 2014/0160976 | A1* | 6/2014 | Dimou | H04W 76/10 370/252 |
| 2014/0241227 | A1* | 8/2014 | Wu | H04W 52/0216 370/311 |
| 2016/0192433 | A1* | 6/2016 | Deenoo | H04W 72/046 370/329 |

\* cited by examiner

METHOD AND APPARATUS FOR CONTROLLING DRX OPERATION IN BEAM FORMING COMMUNICATION SYSTEM

CROSS-REFERENCE TO RELATED APPLICATION AND CLAIM OF PRIORITY

The present application is related to and claims the benefit under 35 U.S.C. § 119(a) of a Korean patent application No. 10-2013-0110951 filed on Sep. 16, 2013 in the Korean Intellectual Property Office, the entire disclosure of which is hereby incorporated by reference.

TECHNICAL FIELD

The present disclosure relates to a wireless communication system, and more particularly to a method and an apparatus for controlling a discontinuous reception operation in consideration of beam forming in a wireless communication system.

BACKGROUND

Typically, a wireless communication system has been developed to provide voice services while ensuring the mobility of users. However, the wireless communication system has been expanded from the voice service to a data service. In recent years, the wireless communication system has been developed to provide a high-speed data service. However, currently, the wireless communication system that provides services suffers from a lack of resources, and users require the wireless communication system to provide higher-speed services to them. Accordingly, there is a necessity for more advanced wireless communication systems.

In the same way, an average amount of data used by wireless communication users is geometrically increasing due to use of wireless mobile stations such as smart phones. In addition to that, users' demands for a higher data transmission rate have been continuously increased.

A method of providing a generally high data transmission rate includes a method of providing communication using a wider frequency band and a method of increasing frequency usage efficiency.

However, it is very difficult to provide a higher average data rate through the latter method. This is because communication technologies of a current generation provide frequency usage efficiency close to a theoretical limit and thus, it is very difficult to increase the frequency usage efficiency up to that or more through a technical improvement.

Accordingly, it can be said that a feasible method for increasing the data transmission rate is a method of providing data services through the wider frequency band. At this time, the thing to consider is an available frequency band. In view of the current frequency distribution policy, a band in which a broadband communication of 1 GHz or more is possible is limited and a practically selectable frequency band is only the millimeter wave band of 30 GHz or more.

Such a signal of the high frequency band causes severe signal attenuation according to a distance differently from a signal of a frequency band of 2 GHz used by the conventional cellular systems. Due to such signal attenuation, service providing coverage of a base station using the same power as the conventional cellular systems will be considerably reduced. In order to solve this problem, a beam forming technique is widely used which concentrates transmission/reception power into a narrow space to increase transmission/reception efficiency of an antenna.

Meanwhile, a wireless communication system may employ a Discontinuous Reception (DRX) operation to efficiently use electric power of a mobile station. A mobile station operated in the DRX may be operated largely in a normal mode and a DRX mode, and the mobile station may enter into a DRX mode if there are no data which is sent or received by the mobile station for a specific time.

However, a DRX operation of the mobile station considering the beam forming has not been defined, and a study on the DRX operation is necessary.

SUMMARY

To address the above-discussed deficiencies, it is a primary object to provide a method and an apparatus for controlling a DRX operation of a mobile station in consideration of beam forming.

In more detail, the present disclosure provides a method and an apparatus for allowing a mobile station, to which beam forming is applied, to effectively manage a DRX operation by defining a beam measuring duration and a feedback duration in a DRX mode.

In accordance with an aspect of the present disclosure, a method of controlling a discontinuous reception operation of a mobile station by a base station in a wireless communication system is provided. The method includes: receiving a discontinuous reception operation request message from the mobile station; determining whether a discontinuous reception operation of the mobile station is set, based on the number of subframes necessary for measuring a beam of the base station by the mobile station and a maximum allowable delay time of a service provided for the mobile station; and when it is determined that a discontinuous reception operation is set for the mobile station, transmitting a discontinuous reception operation response message containing information on a beam measuring duration and a feedback duration to the mobile station.

In accordance with another aspect of the present disclosure, a base station for controlling a discontinuous reception operation of a mobile station in a wireless communication system is provided. The base station includes: a transceiver for transmitting and receiving a signal to and from a mobile station; and a controller for receiving a discontinuous reception operation request message from the mobile station, determining whether a discontinuous reception operation of the mobile station is set, based on the number of subframes necessary for measuring a beam of the base station by the mobile station and a maximum allowable delay time of a service provided for the mobile station, and when it is determined that a discontinuous reception operation is set for the mobile station, transmitting a discontinuous reception operation response message containing information on a beam measuring duration and a feedback duration to the mobile station.

In accordance with another aspect of the present disclosure, a method of controlling a discontinuous reception operation of a mobile station in a wireless communication system is provided. The method includes: transmitting a discontinuous reception operation request message to a base station; receiving a discontinuous reception operation response message containing information on a beam measuring duration and a feedback duration from the base station; and controlling the discontinuous reception operation according to the information contained in the discontinuous reception operation response message.

In accordance with another aspect of the present disclosure, a mobile station for controlling a discontinuous reception operation in a wireless communication system is provided. The mobile station includes: a transceiver for transmitting and receiving a signal to and from a base station; and a controller for transmitting a discontinuous reception operation request message to the base station, receiving a discontinuous reception operation response message containing information on a beam measuring duration and a feedback duration from the base station, and controlling the discontinuous reception operation according to information contained in the discontinuous reception operation response message.

According to an embodiment of the present disclosure, a duration for measuring a beam in a DRX mode and a duration of feeding back a measurement result are defined in a wireless communication system considering beam forming. Accordingly, power consumption of a mobile station can be reduced by supporting a DRX mode of the mobile station which performs beam forming.

Further, according to an embodiment of the present disclosure, because the mobile station does not wake up in all beam measuring durations to measure a reference signal but stops measuring a reference signal if the reference signal exceeds a predetermined reference value to switch off a power source, power can be further saved.

According to an embodiment of the present disclosure, because optimum transmission beam information of a base station can be transmitted using channel reciprocity in a beam feedback duration, power can be additionally saved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
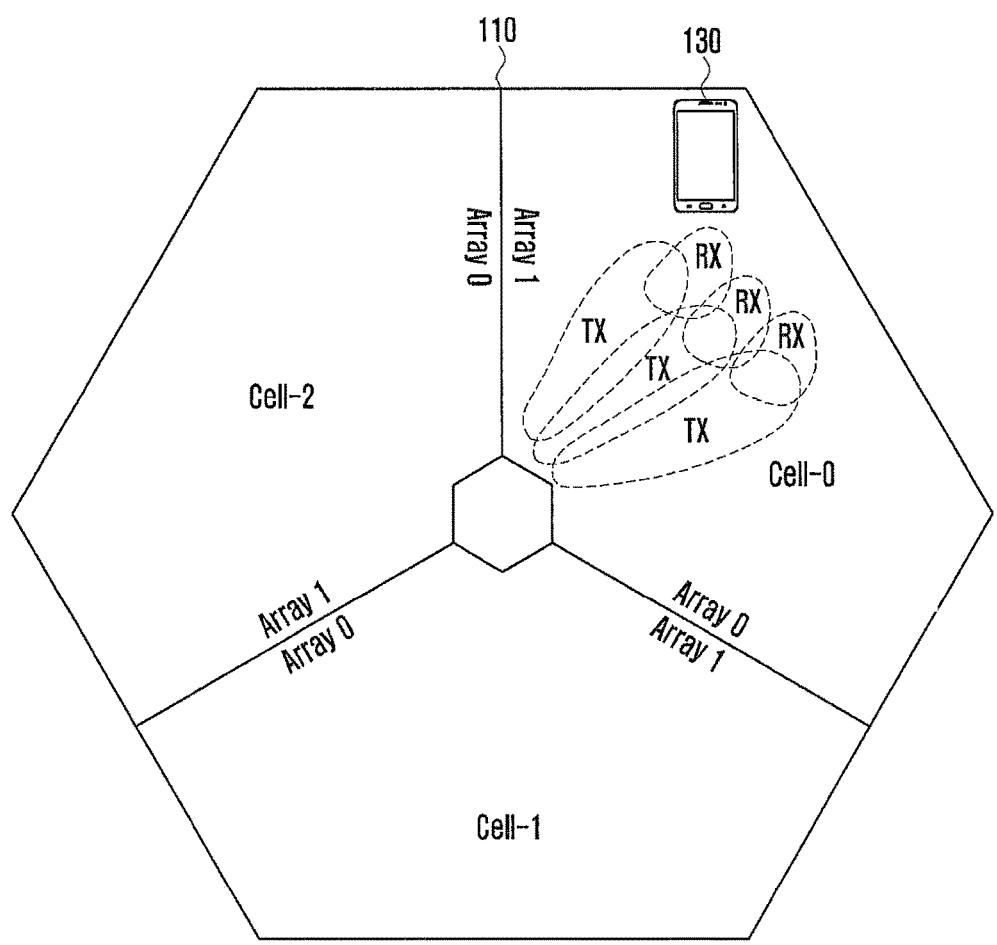
FIG. 1 illustrates a base station and a mobile station for providing beam forming by using an array antenna.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, exemplary embodiments of the present disclosure will be described with reference to the accompanying drawings. It is noted that, where possible, the same reference numerals are designated to the same components in the accompanying drawings. Further, a detailed description of a known function and configuration which may make the subject matter of the present disclosure unclear will be omitted.

FIG. 1 illustrates a base station and a mobile station for providing beam forming by using an array antenna.

Referring to FIG. 1, each of cells Cell-0, Cell-1, and Cell-2 of the base station 110 includes a plurality of array antennas Array 0 and Array 1. The base station 110 can transmit data, while changing a direction of a downlink transmission beam Tx by using the array antennas Array 0 and Array 1. In addition, a mobile station 130 can also receive data while changing a direction of a reception beam Rx.

In a system for performing communication by using the beam forming technique, the base station 110 and the mobile station 130 provide data services by selecting a direction of transmission beams and a direction of reception beams showing an optimal channel environment among various directions of the transmission beams and the reception beams. This process can be applied not only to a downlink channel through which data are transmitted from the BS 110 to the MS 130, but also to an uplink channel through which data are transmitted from the MS 130 to the BS 110.

When the number of directions of transmissible beams of the base station 110 is N and the number of directions of receivable beams of the mobile station 130 is M, an optimal downlink transmission/reception direction is selected through the simplest method as follows.

The base station 110 transmits a previously promised signal at least M times or more in each of the N transmissible directions, and the mobile station 130 receives the N transmission beams by using M reception beams.

According to the method, the base station 110 should transmit a specific reference signal at least N×M times, and the mobile station 130 should receive the reference signal N×M times to measure reception intensity of the received signal. The mobile station 130 can determine the direction corresponding to the measurement value with the highest reception strength among the N×M measurement values as an optimal transmission/reception beam direction, that is, a combination of an optimal transmission beam direction and an optimal reception beam direction.

The process of transmitting a signal one or more times in every transmittable direction by the base station 110 as described above is referred to as a beam sweeping process, and the process of selecting the optimal transmission/reception beam direction by the mobile station 130 is referred to as a beam selection process. The process of selecting the optimal downlink transmission/reception beam can also be applied to an uplink transmission/reception process of transmitting data from the mobile station 130 to the base station 110 in the same way.

Figure 2:
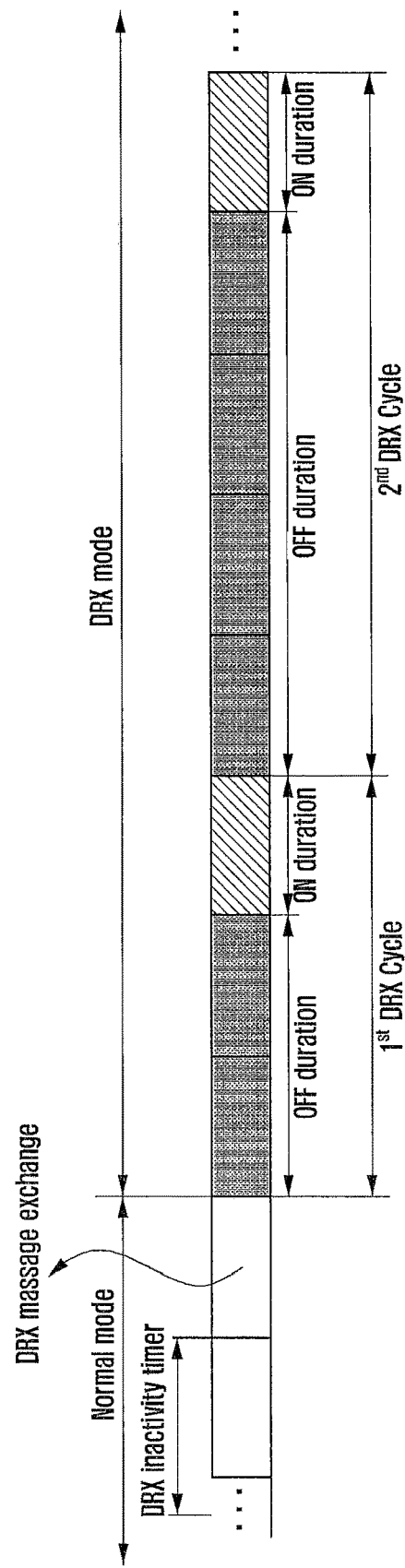
FIG. 2 illustrates a discontinuous reception (DRX) mode of a mobile station.

FIG. 2 illustrates a discontinuous reception (DRX) mode of a mobile station. Referring to FIG. 2, the mobile station can support a normal mode and a DRX mode. If the mobile station neither sends nor receives data for a specific time, the mobile station enters into a DRX mode. The DRX mode includes two sections of an off duration and an on duration, and the sum of the off duration and the on duration can be referred to as a DRX cycle.

In this case, the on duration is not variable but the off duration is variably operated as a short duration or a long duration. The parameters used for the DRX mode include a DRX inactivity timer, a short DRX cycle, a DRX short cycle timer, a long DRX cycle, an on duration timer, and a DRX offset, and the values are transmitted from the base station to the mobile station when a data bearer is produced.

Meanwhile, a power source of a transceiver of the mobile station is switched off and power consumption of the mobile station is reduced in the off duration, and the mobile station wakes up to transmit and receive data in an on duration. The mobile station wakes up in the on duration to identify data which the mobile station will receive, and when the mobile station has no data to receive, it enters into the off duration again to reduce power consumption, and when the mobile station has data to receive, it receives the data.

Meanwhile, in a wireless mobile communication system considering beam forming, the currently used beam should satisfy directions of a transmission beam and a reception beam showing an optimum channel environment. However, if the DRX mode is used, because the mobile station powers off its transceiver during the off duration, a continuous measurement of the current transmission/reception beam cannot be performed.

Accordingly, when the mobile station receives data from the base station in the on duration, it may not satisfy directions of a transmission beam and a reception beam showing an optimum channel environment.

Figure 3:
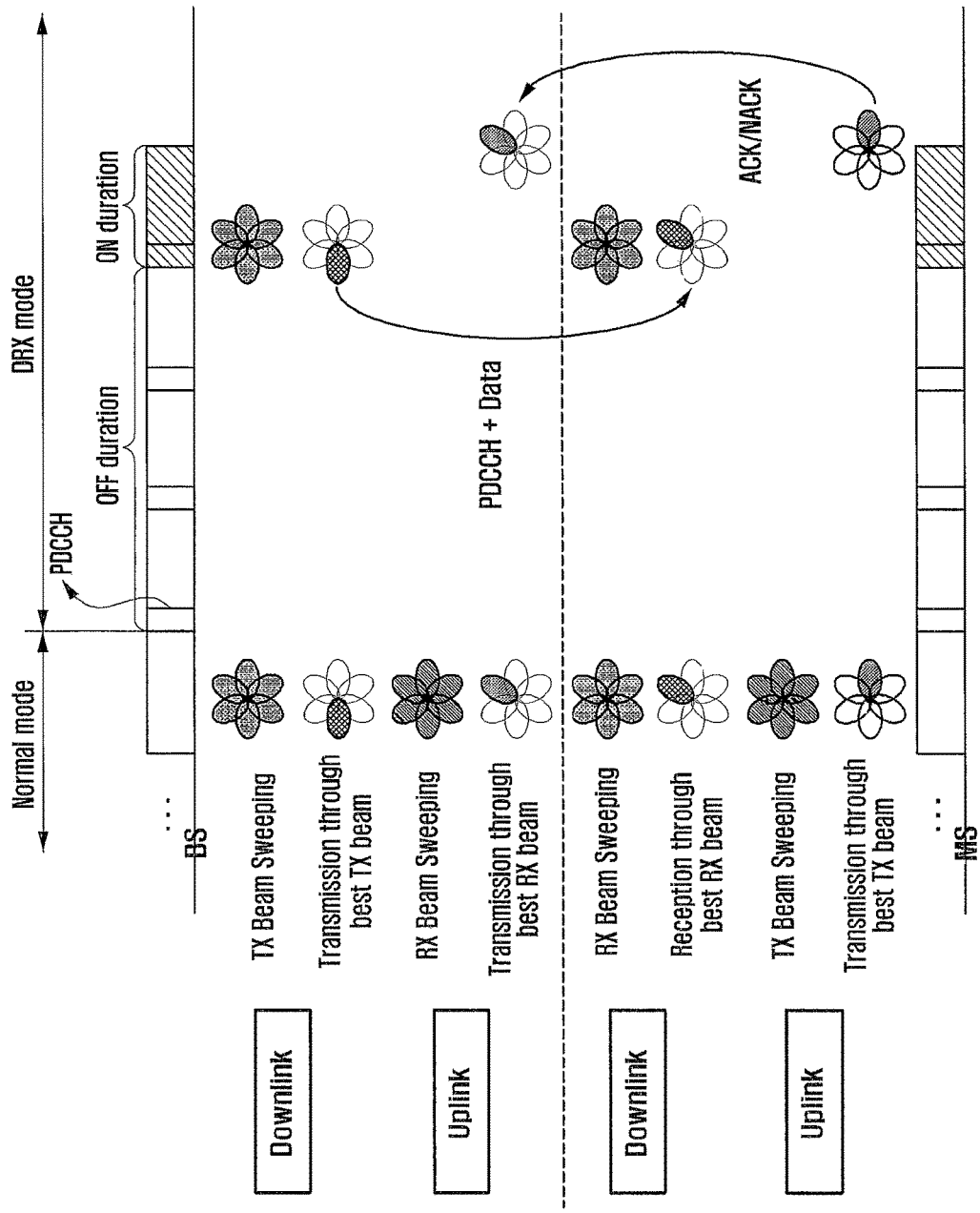
FIG. 3 illustrates a problem of not satisfying a direction of a transmission beam and a direction of a reception beam.

FIG. 3 illustrates a problem of not satisfying a direction of a transmission beam and a direction of a reception beam.

If the mobile station using beam forming enters into the DRX mode in FIG. 3, it may not recognize which reception beam it should use to receive a data information message (PDCCH) and data which the base station sends when power consumption is saved through the off duration and the mobile station wakes up in the on duration.

In more detail, while the mobile station is operated in the off duration in the DRX mode, a wireless channel situation between the mobile station and the base station can change abruptly. However, because the wireless channel situation which has changed in the corresponding duration cannot be tracked while the mobile station is operated in the off duration, it cannot be confirmed whether the beam used shortly before the off duration is still currently effective when the mobile station is converted into the on duration then.

Accordingly, when the mobile station considering beam forming performs a DRX operation, it is necessary to select the directions of the transmission beam and the reception beam favorably showing an optimum channel environment even after the off duration is converted to the on duration.

Figure 4:
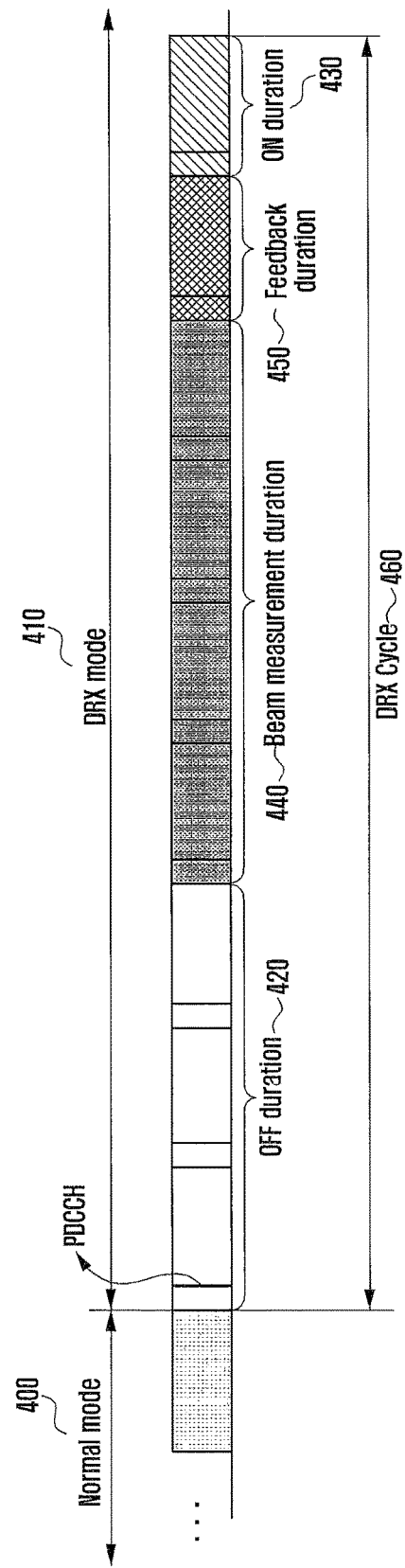
FIG. 4 illustrates a DRX mode suggested in an embodiment of the present disclosure.

FIG. 4 illustrates a DRX mode suggested in an embodiment of the present disclosure. Referring to FIG. 4, the mobile station can enter into the DRX mode 410 in the normal mode 400. In this case, in the DRX mode suggested in the embodiment of the present disclosure, the DRX cycle 460 can be set to include a beam measurement duration 440 and a feedback duration 450 as well as the on duration 430 and the off duration 420 which are conventional.

In this case, the length (number) of a subframe is allocated to the beam measurement duration 440 to correspond to the number of reception beams, and a predetermined length of a subframe (for example, one subframe) can be allocated to the feedback duration. For example, when the number of the reception beams of the mobile station is four, four subframes can be allocated to the beam measurement duration 440. Here, the subframe is a unit time operated in the wireless mobile communication system, and one subframe can correspond to 1 ms.

In the beam measurement duration, the base station transmits a signal which is known to and promised by the base station and the mobile station, for example, a reference signal through beam sweeping. That is, the base station can transmit the reference signal through all transmission beams in a predetermined subframe.

In response, the mobile station can measure a reference signal using only one reception beam for each subframe in the subframes of the beam measurement duration 440.

After measuring a reference signal using one reception beam for each subframe for a beam measuring duration 440, the mobile station can transmit a measurement result from the feedback duration 450 to the base station.

Figure 5A:
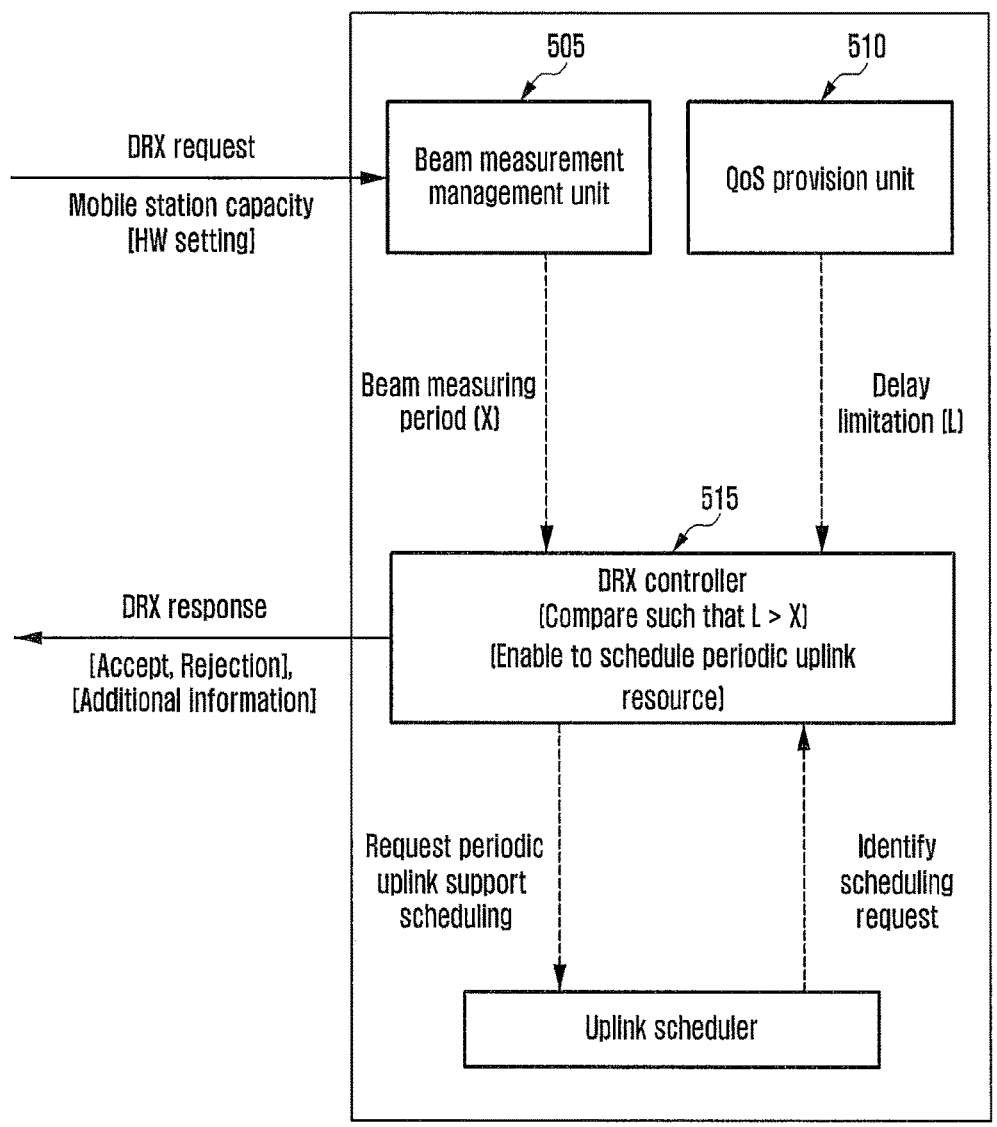
FIG. 5A is a block diagram showing an internal structure of a base station for the DRX mode suggested in the embodiment of the present disclosure.

Detailed operations of the base station and the mobile station in the beam measuring duration 440 and the feedback duration 450 will be described below. FIG. 5A is a block diagram showing an internal structure of a base station for the DRX mode suggested in the embodiment of the present disclosure.

As shown in FIG. 5A, the base station can receive a DRX request message transmitted from the mobile station. The message can be received through a transceiver (not shown), and a message can be transmitted in the same way as will be described below.

The DRX request message can include at least one piece of information selected from an ID of the mobile station, the number of reception beams, and the number of RF chains through which a reception beam for each subframe can be seen. Here, the RF chain can refer to the number of data streams which can be processed by the mobile station at the same time.

Then, a beam measurement management unit 505 can transmit information on a beam measurement period X to a DRX controller 515. A QoS provision unit 510 can transmit information on a delay constraint L to the DRX controller 515. Then, the base station, in particular, the DRX controller 515 (or can be referred to as a controller) can determine whether the DRX mode is to be used in consideration of information on a beam measuring duration according to the reception beam of the mobile station and a QoS of data currently serviced by the mobile station.

The DRX controller 515 sends the determination result to the mobile station through a DRX response message. The DRX response message can be, for example, a high level signaling (RRC signaling), and can include information on a DRX accept/rejection.

When the DRX response message is regarding an accept, information in below Table 1 can be added to the DRX response.

TABLE 1

Starting point (frame) of DRX
Short DRX Cycle, Long DRX Cycle length
ON/OFF duration
Starting point (frame) of beam measurement period
beam feedback channel information A detailed process of responding to a DRX request of the mobile station by the DRX controller 515 is as follows.

First, if receiving a DRX request message transmitted from the mobile station, the DRX controller 515 calculates the number X of subframes necessary for measuring a beam through Equation 1 based on information on the number N of reception beams of the mobile station and information on the number n of RF chains.

$$X=N/n$$ [Equation 1]

N: *Number of reception beams of a mobile station
n: *Number of RF chains of a mobile station The DRX controller 515 compares an allowable maximum delay time of a currently received service with the number X of subframes necessary for measuring a beam.

If the number X of subframes necessary for measuring a beam is larger than an allowable maximum delay time of a service, the allowable maximum delay time of the service can be exceeded because of the beam measuring duration if the mobile station uses the DRX, so that the service cannot be satisfied. In this case, the DRX controller 515 can reject a DRX request of the mobile station.

Meanwhile, if the number of subframes necessary for measuring a beam is smaller than an allowable maximum delay time of the service, the DRX including measurement of a beam can be allowed, so that the DRX controller 515 accepts the DRX request of the mobile station.

If being operated in the DRX mode, the mobile station measures a reference signal of the base station by N/n subframes in the beam measuring duration of the DRX cycle. In this case, the mobile station measures reference signals while changing the reception beam of the mobile station in all beam measuring durations. After finishing the measurement, the mobile station determines a direction showing a measurement value (measurement result) of the strongest intensity among the measurement values as an optimum transmission/reception beam direction, that is, a combination of optimum directions of the transmission beam and the reception beam. The mobile station can transmit the selected optimum transmission beam information to the base station in the feedback duration. Because the transmission beam information means transmission beam information of the base station, it can be used together with the term of downlink transmission beam information.

Meanwhile, according to the embodiment of the present disclosure, the beam measuring duration of the mobile station can be used as follows to increase a power consumption effect of the mobile station.

When the mobile station measures a reference signal in the beam measuring duration, the reference signal can be measured, starting from an optimum reception beam selected from the most recent DRX cycle. Thereafter, the mobile station can stop measuring a beam when the received measurement value is higher than a predetermined threshold, and can regard the remaining beam measuring durations as off durations to power off the transceiver of the mobile station and reduce power consumption.

Figure 5B:
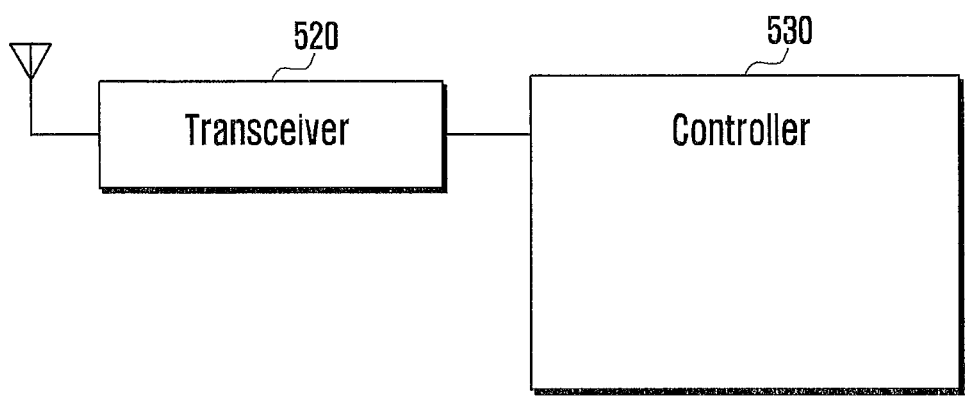
FIG. 5B is a block diagram showing an internal structure of a mobile station for the DRX mode suggested in the embodiment of the present disclosure.

FIG. 5B is a block diagram showing an internal structure of a mobile station for the DRX mode suggested in the embodiment of the present disclosure. As shown in FIG. 5B, the mobile station of the present disclosure can include a transceiver 520 and a controller 530.

The transceiver 520 transmits and receives a signal to and from the base station. The signal can include control information and data. According to the embodiment of the present disclosure, the transceiver 520 can transmit a DRX request message to the base station and receive a DRX response message transmitted from the base station.

The controller 530 can control flows of signals between blocks such that the mobile station can be operated according to the embodiment of the present disclosure.

For example, the controller 530 can transmit a discontinuous reception operation request message to the base station, and can receive a discontinuous reception operation response message including information on the beam measuring duration and the feedback duration from the base station. The controller 530 can control the discontinuous reception operation according to the information included in the discontinuous reception operation response message.

In detail, the controller 530 performs a control to measure a reference signal transmitted from the base station while changing the reception beam of the mobile station in units of subframes in the beam measuring duration. The controller can perform a control to determine optimum downlink transmission beam information of the base station based on the measurement result, and transmit the determined optimum downlink transmission beam information of the base station from the feedback duration to the base station.

Meanwhile, according to the embodiment of the present disclosure, the controller 530 can determine whether a measurement result of an arbitrary subframe included in the beam measuring duration is larger than a preset reference value. If the measurement result of the arbitrary subframe is larger than a preset reference value according to the determination result, it can be controlled such that a measurement is not performed in the remaining subframe included in the beam measuring duration and the power source of the transceiver is switched off.

According to the embodiment of the present disclosure, the controller 530 can perform a control to transmit optimum downlink transmission beam information of the base station to the base station based on the optimum downlink reception beam of the mobile station.

In this case, the number of the subframes is configured such that the length of the beam measuring duration corresponds to the number of reception beams of the mobile station, and the length of the feedback duration corresponds to the length of an arbitrary number (for example, one) of subframes.

Figure 6:
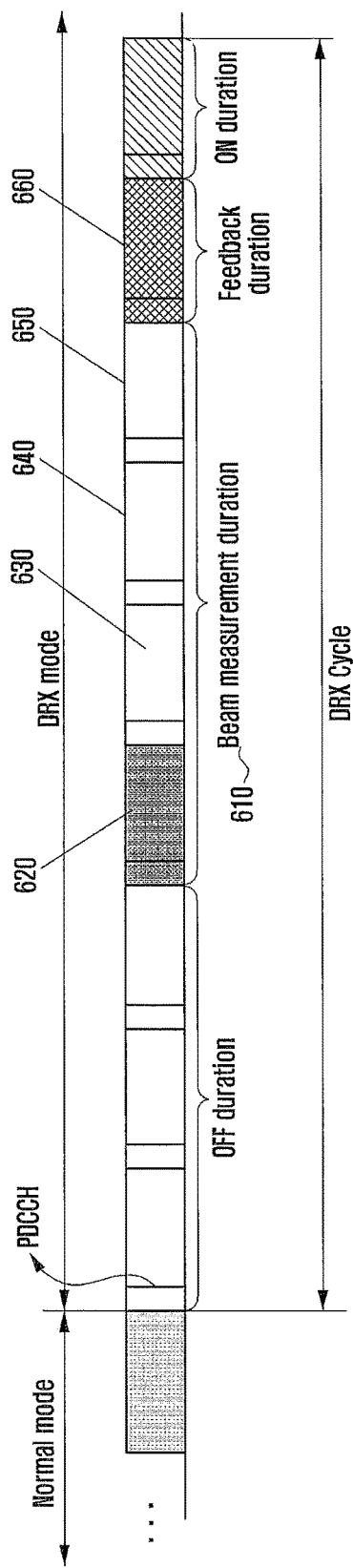
FIG. 6 illustrates a beam measuring process of a mobile station operated to increase a power consumption effect of the mobile station according to the embodiment of the present disclosure.

FIG. 6 illustrates a beam measuring process of a mobile station operated to increase a power consumption effect of the mobile station according to the embodiment of the present disclosure.

The reference signal was measured with the optimum reception beam selected shortly before the mobile station entered into an off duration in the first subframe 620, and FIG. 6 illustrates a case in which the measurement value is higher than a predetermined threshold.

In this case, the mobile station may not measure a beam in the remaining beam measuring durations 630, 640, and 650 other than the beam measuring duration 610, and can transmit the selected information on the direction of the transmission beam and the reception beam from the feedback duration 660 to the base station.

Meanwhile, a method of transmitting optimum transmission beam information to a base station by a mobile station according to an embodiment of the present disclosure is as follows.

The mobile station which determined an optimum transmission beam direction through a beam measuring duration can transmit the result value through beam sweeping in the feedback duration. That is, a process opposite to that of a downlink is performed by the mobile station and the base station, and the information transmitted from the mobile station to the base station may not be a reference signal but transmission beam information of the base station (that is, optimum base station transmission beam information). In the embodiment of the present disclosure, the mobile station transmits optimum transmission beam information of the base station to the base station while sweeping beams through all transmission beams.

According to another embodiment of the present disclosure, channel reciprocity can be used to reduce the number of transmissions to the feedback duration and reduce power consumption of the mobile station.

The channel reciprocity means that channels of a downlink and an uplink have a channel reciprocity. In particular, Time Division Duplex (TDD) has a channel reciprocity. Accordingly, an optimum uplink transmission/reception beam is determined by using an optimum downlink transmission/reception beam.

For example, if it is assumed that an optimum base station transmission beam for a downlink (downlink transmission beam) is No. 3 beam and an optimum mobile station reception beam (downlink reception beam) is No. 2 beam, an optimum mobile station transmission beam for an uplink (uplink transmission beam) is No. 2 beam and an optimum base station reception beam (uplink reception beam) is No. 3 beam. Accordingly, it can be considered that the mobile station does not transmit optimum base station transmission beam (downlink transmission beam) information through beam sweeping but transmits the optimum base station transmission beam using an optimum mobile station reception beam (downlink reception beam).

Thereafter, a method of transmitting optimum transmission beam information to the mobile station by the base station can be as follows.

The base station transmits a data information message (PDCCH) containing control information and data to the mobile station with an optimum downlink transmission beam of the base station which was informed of by the mobile station through a feedback duration. The PDCCH is informed of optimum uplink transmission beam information of the mobile station as well as data (scheduling) information.

If a method using a channel reciprocity is used in the feedback duration, optimum uplink transmission beam information of the mobile station may not be carried in the PDCCH.

If identifying the PDCCH transmitted from the base station, the mobile station can determine whether there are data which are to be received from the base station by the mobile station or which are to be transmitted to the base station.

If there are data that are to be received from the base station, or that are to be transmitted to the base station, the mobile station enters into an off duration again to reduce power consumption.

If there are data that are to be received from the base station or that are to be transmitted to the base station, the mobile station can receive data based on the identified information and transmit an ACK/NACK signal to the uplink based on the optimum uplink transmission beam.

Figure 7:
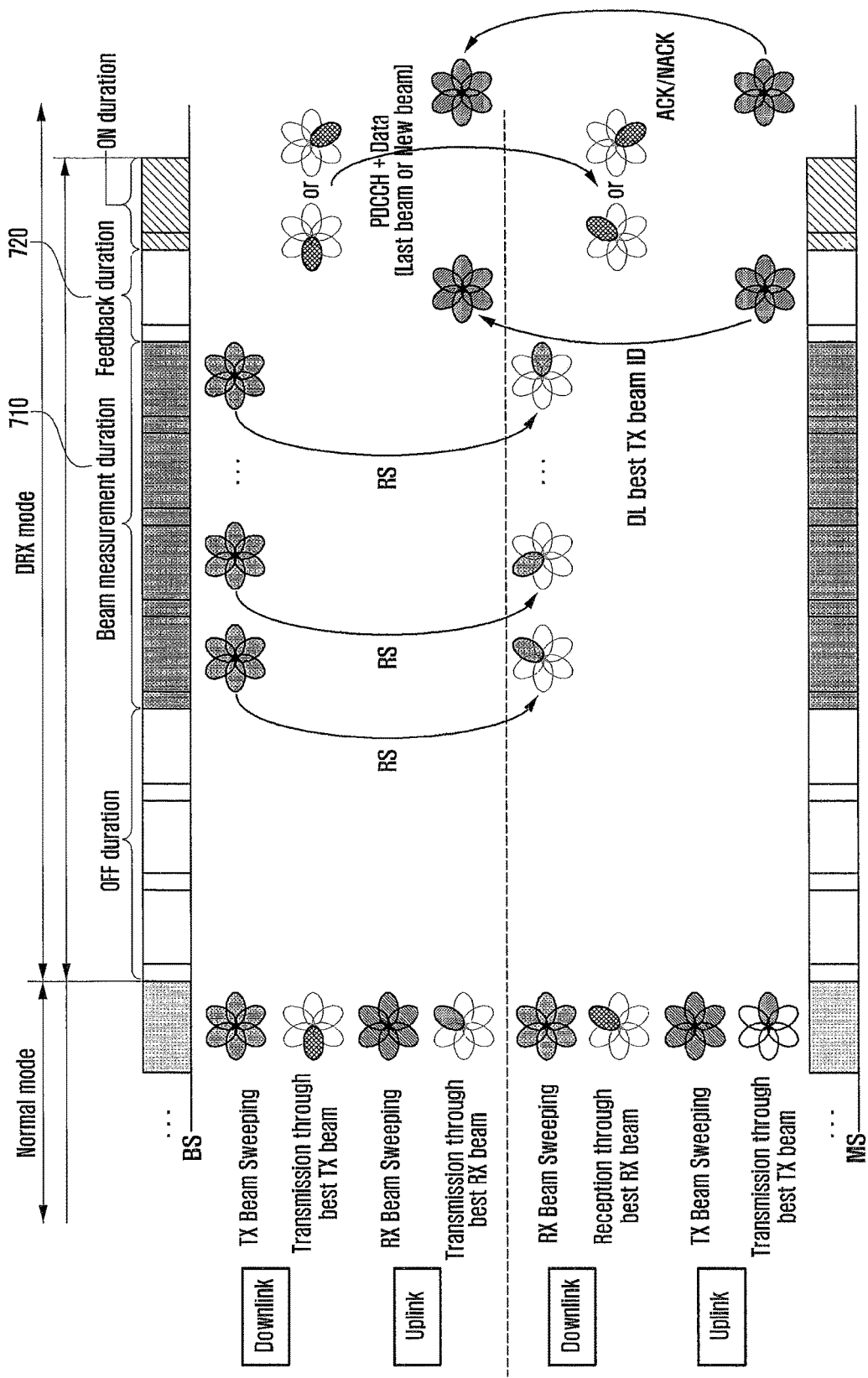
FIG. 7 illustrates an overall operation process of the DRX mode suggested in the embodiment of the present disclosure.

FIG. 7 illustrates an overall operation of the DRX mode suggested in the embodiment of the present disclosure.

When being operated in the DRX mode, the mobile station wakes up in the beam measuring duration 710 and measures a reference signal transmitted from the base station. After measuring the reference signal, the mobile station transmits direction information including the strongest measurement value to the base station as an optimum transmission beam using a beam sweeping or channel reciprocity in the feedback duration 720.

As described above, when the beam sweeping is used, the mobile station can transmit transmission beam information of the base station showing the strongest measurement value through beam sweeping using all transmission beams of the mobile station.

When the channel reciprocity is used, transmission beam information of the base station showing the strongest measurement value is transmitted to the base station through the optimum reception beam of the mobile station.

The base station transmits the PDCCH and data to the mobile station using the optimum transmission beam based on the information.

After receiving the data, the mobile station transmits the ACK/NACK information indicating whether the data were successfully received to the optimum transmission beam.

Figure 8:
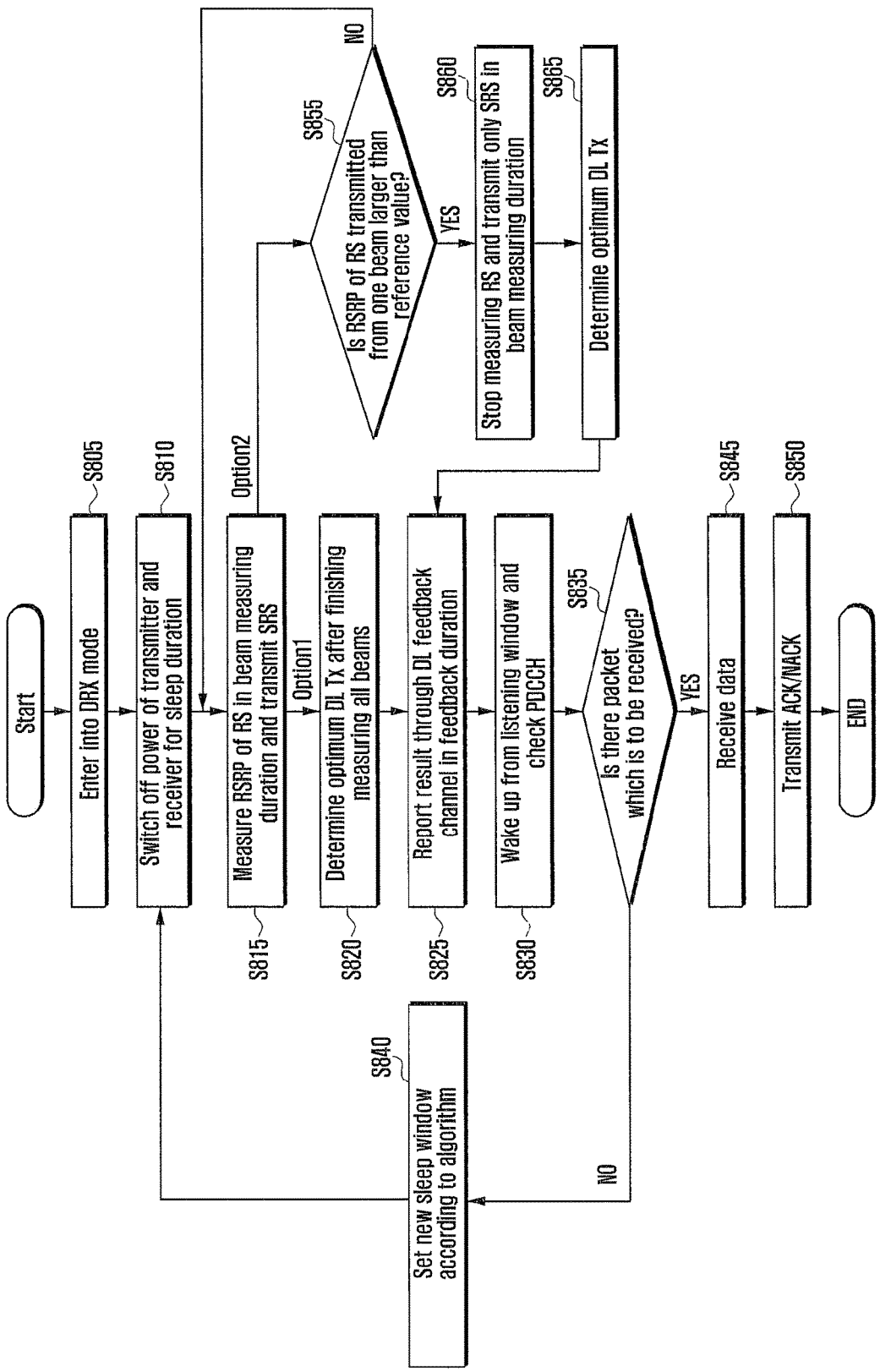
FIG. 8 is a flowchart showing an operation sequence of the mobile station according to the embodiment of the present disclosure.

FIG. 8 is a flowchart showing an operation sequence of the mobile station according to the embodiment of the present disclosure. Prior to a description of FIG. 8, it is assumed that the mobile station has already received setting information on the DRX through signaling with the base station. That is, the mobile station can transmit a DRX request message to the base station, and accordingly, can receive the DRX response message determined by an internal operation of the base station. The DRX response message can contain information on a beam measuring duration starting time point and beam feedback channel information according to the embodiment of the present disclosure.

When receiving the DRX response message from the base station, the mobile station can identify whether the DRX operation is to be managed or how the DRX operation is to be managed.

Next, the mobile station enters into the DRX mode at a predetermined time point in step S805. The mobile station powers off the transmitter and the receiver for a sleep duration (off duration) in step S810.

The mobile station measures a reception signal intensity (for example, a Reference Signal Received Power (RSRP) of a reference signal RS transmitted from the base station, and transmits a Sounding Reference Signal (SRS).

Thereafter, according to an embodiment (Option 1) of the present disclosure, the mobile station determines an optimum downlink transmission beam (DL Tx beam) after finishing measuring all beams of the mobile station. The mobile station can determine a beam having a reception signal intensity (for example, RSRP) of the highest value as an optimum downlink transmission beam.

The mobile station proceeds to step S825, and reports a result through a DL feedback channel in the feedback duration. That is, the mobile station can transmit information on the optimum downlink transmission beam to the base station. In this case, the mobile station can transmit optimum transmission beam information to the base station while beam sweeping the optimum transmission beam information through all transmission beams of the mobile station, or can transmit the optimum transmission beam information to the base station using channel reciprocity.

Next, the mobile station wakes up from a listening window and checks the PDCCH in step S830. The mobile station determines whether there is a packet which is to be received, in step S835.

When there is no packet which is to be received, the mobile station proceeds to step S840 and sets a new sleep window according to an algorithm.

When there is a packet which is to be received, the mobile station proceeds to step S845 and receives data. The mobile station transmits ACK/NACK information on the data to the base station in step S850.

Meanwhile, according to another embodiment (Option 2) of the present disclosure, after measuring a beam in a beam measuring duration in step S815, the mobile station can proceed to step S855 to determine whether a reception signal intensity (for example, RSRP) of a reference signal transmitted in a beam of the base station is larger than a preset reference value. If the reception signal intensity is larger than the preset reference value, the base station proceeds to step S860 to transmit only an SRS without measuring a reference signal in the following subframes in the beam measuring duration. The mobile station can perform the procedures after step 825 after determining an optimum downlink transmission beam in step S865.

Figure 9:
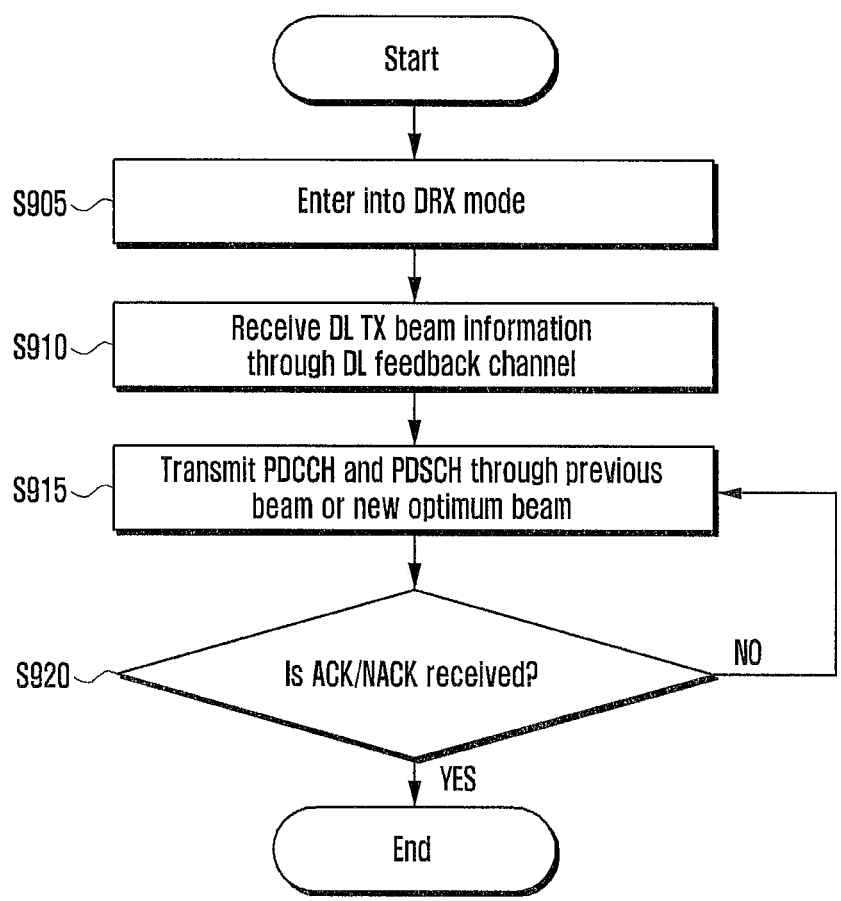
FIG. 9 is a flowchart showing an operation sequence of the base station according to the embodiment of the present disclosure.

FIG. 9 is a flowchart showing an operation sequence of the base station according to the embodiment of the present disclosure.

First, prior to a description of FIG. 9, it is assumed that the base station has already transmitted setting information on the DRX through signaling with the mobile station. That is, the base station can receive a DRX request message from the mobile station, and in this case, the base station can determine whether the DRX is to be applied to the mobile station according to Equation 1. The base station can transmit a DRX response message reflecting the determination to the mobile station. When the base station accepts a DRX request of the mobile station, the DRX response message can contain information on a beam measuring duration starting time point and beam feedback channel information according to the embodiment of the present disclosure.

Thereafter, the base station enters into the DRX mode in step S905. The base station receives optimum downlink transmission beam information transmitted from the mobile station through a downlink feedback channel in step S910.

The base station can transmit a Physical Downlink Control Channel (PDCCH) and a Physical Downlink Shared Channel (PDSCH) through the previous beam or a new optimum beam in step S915.

The base station can determine whether an ACK/NACK signal is received from the mobile station in step S920, and when an ACK/NACK signal is received, can complete a procedure, and when an ACK/NACK signal is not received, can return to step S915 to perform the following procedures.

Meanwhile, according to another embodiment of the present disclosure, a DRX mode of the mobile station can be supported not using a reference signal but using a separate signal for the mobile station to find out an optimum transmission/reception beam.

Figure 10:
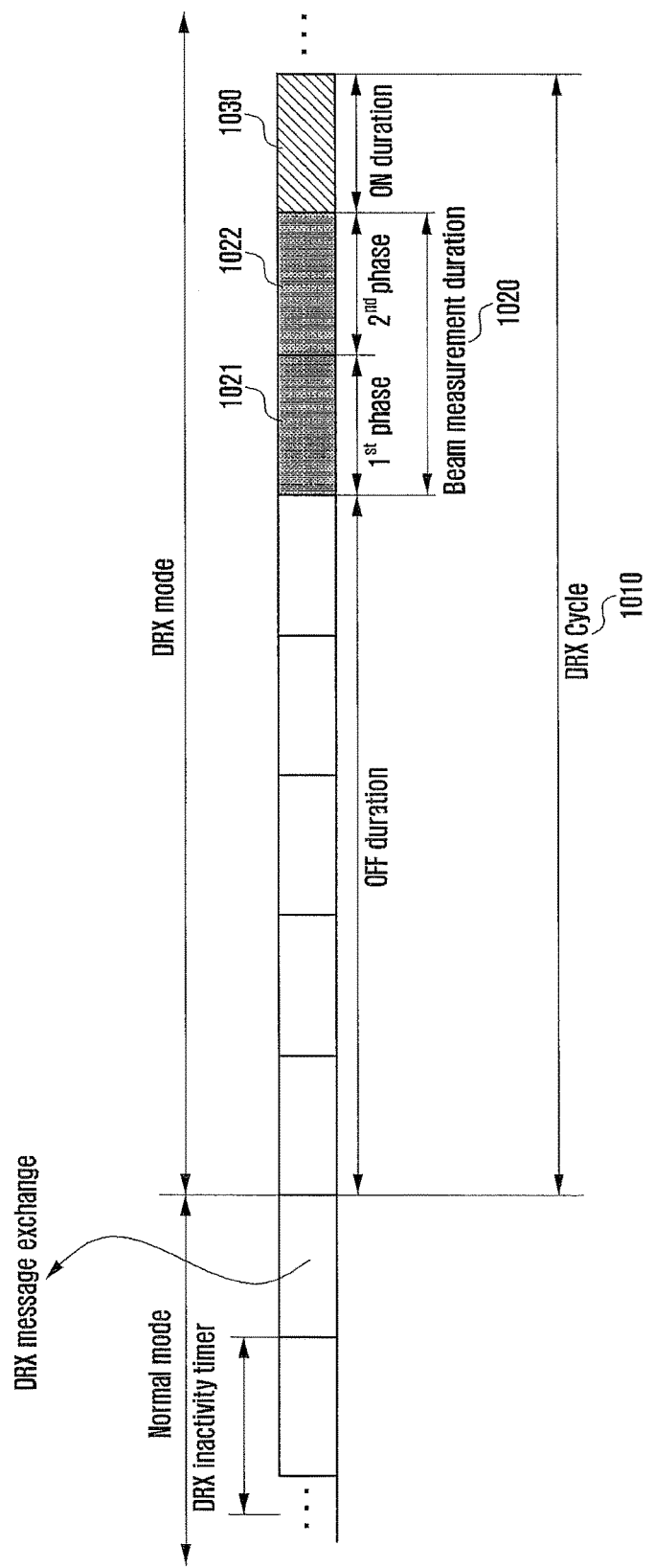
FIG. 10 illustrates a method for supporting a DRX mode of a mobile station by using a separate signal for the mobile station in a wireless communication system considering beam forming according to another embodiment of the present disclosure.

FIG. 10 illustrates the operation of supporting a DRX mode of a mobile station by using a separate signal for the mobile station in a wireless communication system considering beam forming according to another embodiment of the present disclosure.

Referring to FIG. 10, a beam measuring duration 1020 includes two stages in a DRX cycle 1010. The first phase 1021 is a duration for finding out an optimum transmission/reception beam for a downlink, and the second phase 1022 is a duration for finding out an optimum transmission/reception beam for an uplink.

A signal transmitted in the first stage is a special signal for the DRX mobile station, and is repeatedly transmitted unlike a reference signal such that all transmission beams of the base station can be transmitted to the subframes. The information carried in the signal can indicate whether there are downlink data. For example, when there are downlink data, information of "1" is carried, when there are not data, information of "0" is carried.

A signal transmitted in the second stage is a special signal for the DRX mobile station, and is repeatedly transmitted unlike a reference signal such that all transmission beams of the mobile station can be transmitted to the subframes. The information carried in the signal can indicate whether there are optimum downlink base station transmission beam information and uplink data. For example, if the optimum downlink base station transmission beam is No. 3 beam, the mobile station transmits information of "3" and information of "1" when there are uplink data together.

Because the base station recognizes an optimum transmission beam of the downlink base station through the second stage, the base station transmits the PDCCH and data to the mobile station using an optimum transmission beam in the on duration 1030.

Then, the optimum transmission beam information of the uplink mobile station is sent together to the PDCCH. Accordingly, because the mobile station recognizes an optimum uplink mobile station transmission beam if the mobile station also receives a PHCCH, the mobile station transmits an ACK signal or a NACK signal to an optimum transmission beam.

Figure 11:
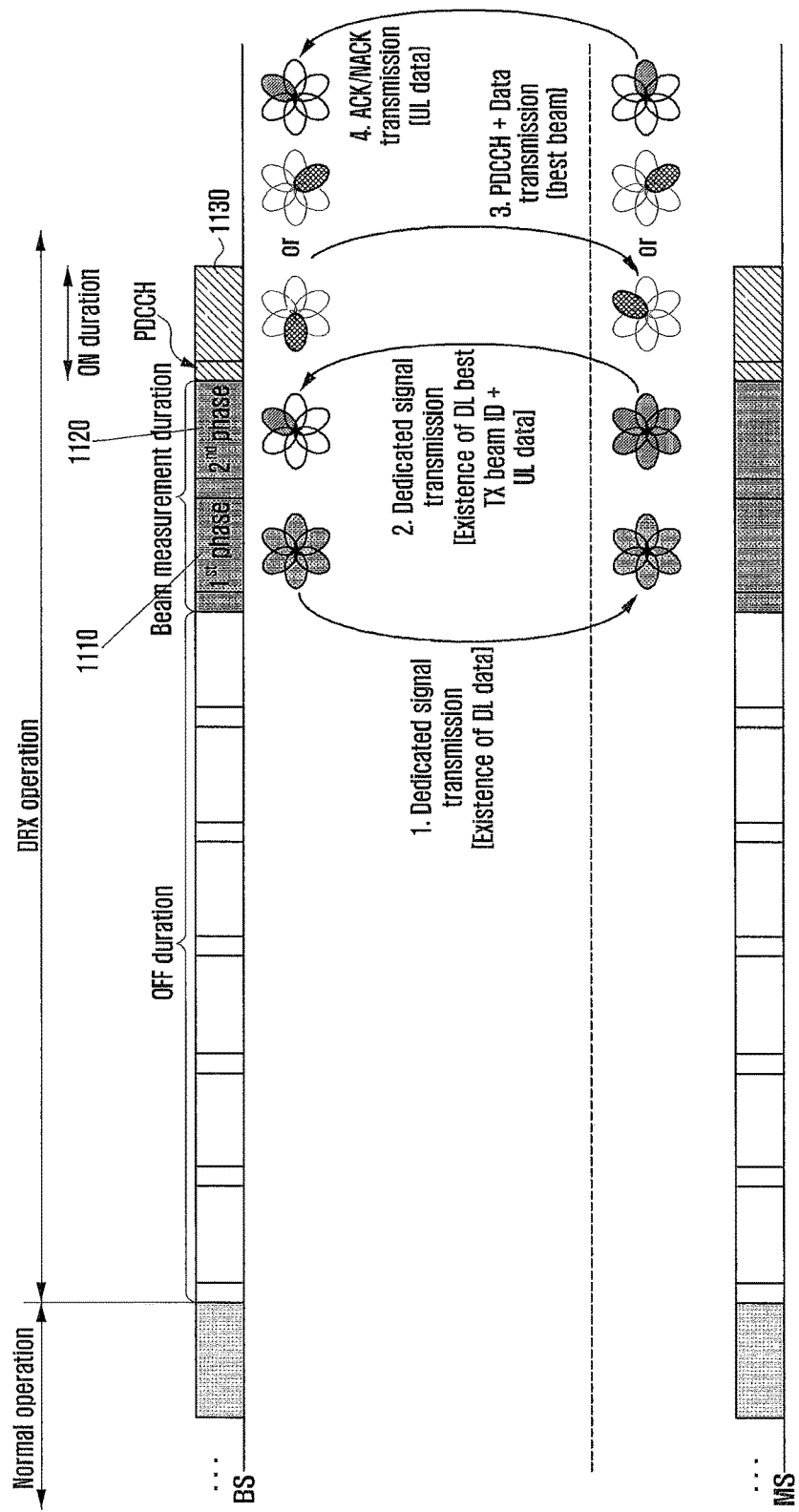
FIG. 11 is a view showing an overall operation process for a DRX mode operating method using a separate signal for a mobile station according to another embodiment of the present disclosure.

FIG. 11 illustrates an overall operation process for a DRX mode operating method using a separate signal for a mobile station according to another embodiment of the present disclosure.

When being operated in the DRX mode, the mobile station wakes up in the first phase beam measuring duration 1110 and measures a special signal for the mobile station. In the second phase beam measuring duration 1120, the mobile station transmits the special signal to the base station. Here, optimum transmission beam information of a downlink and information reporting whether there are uplink data are carried.

The base station recognizes an optimum transmission beam of a downlink of the base station through the second stage beam measuring duration, and transmits the PDCCH and data to the mobile station using the optimum transmission beam in the on duration 1130.

Then, optimum uplink transmission beam information of the mobile station is also transmitted to the PDCCH.

The mobile station that received the PDCCH transmits an ACK/NACK signal to the optimum uplink transmission beam after receiving data.

Embodiments of the present disclosure disclosed in the specification and the drawings are only particular examples to easily describe the technical matters of the present disclosure and assist in the understanding of the present disclosure, and do not limit the scope of the present disclosure. It is apparent to those skilled in the art that other modified examples based on the technical idea of the present disclosure can be implemented as well as the embodiments disclosed herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of controlling a discontinuous reception operation of a mobile station by a base station in a wireless communication system, the method comprising:
receiving a request message for discontinuous reception (DRX) operation from the mobile station;
determining whether to set a discontinuous reception operation for the mobile station, based on a number of subframes necessary for measuring a beam of the base station by the mobile station to perform a communication using a beam forming between the mobile station and the base station, and a maximum allowable delay time for a service provided for the mobile station, the beam being associated with a plurality of directions; and
when the discontinuous reception operation is set for the mobile station, transmitting a response message containing information on a beam measuring duration for measuring the beam in a DRX mode and a feedback duration for transmitting a measurement result of the beam in the DRX mode to the mobile station,
wherein a signal is transmitted or received based on the beam associated with at least one direction selected from the plurality of directions, and
wherein a length of the beam measuring duration corresponds to a number of reception beams of the mobile station, and a length of the feedback duration corresponds to a length of a predetermined number of subframes.

2. The method of claim 1, wherein the number of subframes necessary for measuring the beam of the base station is determined based on a number of reception beams of the mobile station and data streams that is processed at a same time.

3. The method of claim 1, further comprising transmitting a reference signal through a beam sweeping in the beam measuring duration.

4. The method of claim 1, further comprising receiving optimum transmission beam information of the base station based on a measurement result for the mobile station through the beam measuring duration, from the mobile station in the feedback duration.

5. The method of claim 4, further comprising transmitting control information and data to the mobile station based on the optimum transmission beam information.

6. The method of claim 5, wherein the control information comprises optimum uplink transmission beam information for the mobile station.

7. A base station for performing a discontinuous reception operation with a mobile station in a wireless communication system, the base station comprising:
a transceiver configured to transmit and receive a signal to or from a mobile station; and
a controller configured to:
receive a discontinuous reception operation request message from the mobile station,
determine whether to set a discontinuous reception (DRX) operation of the mobile station, based on a number of subframes necessary for measuring a beam of the base station by the mobile station to perform a communication using a beam forming between the mobile station and the base station, and a maximum allowable delay time for a service provided for the mobile station, the beam being associated with a plurality of directions; and
when the discontinuous reception operation is set for the mobile station, transmit a response message containing information on a beam measuring duration for measuring the beam in a DRX mode and a feedback duration for transmitting a measurement result of the beam in the DRX mode to the mobile station,
wherein a signal is transmitted or received based on the beam associated with at least one direction selected from the plurality of directions, and
wherein a length of the beam measuring duration corresponds to a number of reception beams of the mobile station, and a length of the feedback duration corresponds to a length of a predetermined number of subframes.

8. The base station of claim 7, wherein the number of subframes necessary for measuring the beam of the base station is determined based on a number of reception beams of the mobile station and data streams that is processed at a same time.

9. The base station of claim 7, wherein the controller is configured to cause the transceiver to transmit a reference signal through a beam sweeping in the beam measuring duration.

10. The base station of claim 7, wherein the controller is configured to cause the transceiver to receive optimum transmission beam information of the base station based on a measurement result for the mobile station through the beam measuring duration in the feedback duration, from the mobile station.

11. The base station of claim 10, wherein the controller is configured to cause the transceiver to transmit control information and data to the mobile station based on the optimum transmission beam information.

12. The base station of claim 11, wherein the control information comprises uplink optimum transmission beam information of the mobile station.

13. A method of performing a discontinuous reception operation in a mobile station in a wireless communication system, the method comprising:
transmitting a discontinuous reception (DRX) operation request message to a base station;
receiving a response message containing information on a beam measuring duration for measuring the beam in a DRX mode and a feedback duration for receiving a measurement result of the beam in the DRX mode from the base station; and performing the discontinuous reception operation according to the information contained in the response message, wherein the beam measuring is to perform a communication using a beam forming between the mobile station and the base station, wherein a beam is associated with a plurality of directions, wherein a signal is transmitted or received based on the beam associated with at least one direction selected from the plurality of directions, and wherein a length of the beam measuring duration corresponds to a number of reception beams of the mobile station, and a length of the feedback duration corresponds to a length of a predetermined number of subframes.

14. The method of claim 13, further comprising measuring a reference signal transmitted from the base station while changing a reception beam of the mobile station in units of subframes in the beam measuring duration.

15. The method of claim 14, further comprising:
determining an optimum downlink transmission beam information of the base station based on the measured reference signal; and
transmitting the determined optimum downlink transmission beam information of the base station to the base station in the feedback duration.

16. The method of claim 14, wherein measuring the reference signal comprises:
determining whether the measured reference signal of a predetermined subframe included in the beam measuring duration is larger than a preset reference value; and
when the measured reference signal is larger than the preset reference value, powering off a transceiver without performing a measurement in remaining subframes of the beam measuring duration.

17. The method of claim 15, wherein transmitting the optimum downlink transmission beam information comprises transmitting the optimum downlink transmission beam information of the base station to the base station based on an optimum downlink reception beam of the mobile station.

18. A mobile station for controlling a discontinuous reception operation in a wireless communication system, the mobile station comprising:
a transceiver configured to transmit or receive a signal to and from a base station; and
a controller configured to:

transmit a discontinuous reception (DRX) operation request message to the base station;

receive a response message containing information on a beam measuring duration for measuring a beam in a DRX mode and a feedback duration for receiving a measurement result of the beam in the DRX mode from the base station; and perform the discontinuous reception operation according to information contained in the response message, wherein the beam measuring is to perform a communication using a beam forming between the mobile station and the base station, wherein a beam is associated with a plurality of directions, wherein a signal is transmitted or received based on the beam associated with at least one direction selected from the plurality of directions, wherein a length of the beam measuring duration corresponds to a number of reception beams of the mobile station, and a length of the feedback duration corresponds to a length of a predetermined number of subframes.

19. The mobile station of claim 18, wherein the controller is configured to measure a reference signal transmitted from the base station while changing a reception beam of the mobile station in units of subframes in the beam measuring duration.

20. The mobile station of claim 19, wherein the controller is configured to:
determine an optimum downlink transmission beam of the base station based on the measured reference signal; and
transmit the determined optimum downlink transmission beam of the base station in the feedback duration to the base station.

21. The mobile station of claim 19, wherein the controller is configured to determine whether a measurement result of a predetermined subframe included in the beam measuring duration is larger than a preset reference value, and when the measurement result is larger than the preset reference value, power off a transmitter while a measurement is not performed in remaining subframes of the beam measuring duration.

22. The mobile station of claim 20, wherein the controller is configured to cause the transceiver to transmit optimum downlink transmission beam information of the base station to the base station based on an optimum downlink reception beam of the mobile station.

* * * * *